US007769698B2

(12) United States Patent
Matic

(10) Patent No.: US 7,769,698 B2
(45) Date of Patent: Aug. 3, 2010

(54) NAVIGATION THROUGH COMPONENTS

(75) Inventor: Dragan S. Matic, Odenheim (DE)

(73) Assignee: SAP AG, Walldorf (DE)

( * ) Notice: Subject to any disclaimer, the term of this patent is extended or adjusted under 35 U.S.C. 154(b) by 339 days.

(21) Appl. No.: 11/689,997

(22) Filed: Mar. 22, 2007

(65) Prior Publication Data

US 2008/0071657 A1      Mar. 20, 2008

Related U.S. Application Data

(60) Provisional application No. 60/841,860, filed on Sep. 1, 2006.

(51) Int. Cl.
    *G06Q 20/00*      (2006.01)
(52) U.S. Cl. .................................. 705/77; 717/100
(58) Field of Classification Search ......... 717/100–178; 705/77
    See application file for complete search history.

(56) References Cited

U.S. PATENT DOCUMENTS

| 6,249,284 | B1* | 6/2001 | Bogdan ....................... 715/764 |
| 6,493,868 | B1 | 12/2002 | DaSilva et al. |
| 2003/0023953 | A1* | 1/2003 | Lucassen et al. ............ 717/106 |
| 2003/0093716 | A1* | 5/2003 | Farchi et al. .................. 714/34 |
| 2004/0010776 | A1* | 1/2004 | Shah ......................... 717/117 |
| 2004/0059802 | A1* | 3/2004 | Jacquemot et al. .......... 709/220 |
| 2004/0205168 | A1 | 10/2004 | Asher |
| 2005/0071805 | A1* | 3/2005 | Lauterbach et al. ......... 717/104 |
| 2005/0076327 | A1 | 4/2005 | Helal et al. |
| 2005/0114240 | A1* | 5/2005 | Watson-Luke et al. ........ 705/34 |
| 2005/0114475 | A1* | 5/2005 | Chang et al. ................ 709/220 |
| 2006/0230320 | A1* | 10/2006 | Salvador et al. .............. 714/38 |
| 2006/0236301 | A1* | 10/2006 | Minium et al. .............. 717/101 |

OTHER PUBLICATIONS

Details of the Web Dynpro for Java Example, SAP Professional Journal, Mar./Apr. 2005.*
Bridge, D. "Software Development—Glossary". Apr. 7, 2005. [Retrieved via Wayback Machine Nov. 5, 2009]. All Pages.*
"Software Testing Glossary". Jun. 23, 2005. [Retrieved via Wayback Machine Nov. 5, 2009]. All Pages.*
Burbeck, s. "Applications Programming in Smalltalk-80(TM): How to use Model-View-Controller (MVC)". Mar. 4, 1997. [Retrieved Nov. 5, 2009] [URL: http://st-www.cs.illinois.edu/users/smarch/st-docs/mvc.html]. All pages.*
Collins-Sussman et. al. "Version Control with Subversion For Subversion 1.1". 2005. All pages.*

(Continued)

*Primary Examiner*—Evens J Augustin
*Assistant Examiner*—Calvin K Cheung
(74) *Attorney, Agent, or Firm*—Fish & Richardson P.C.

(57) ABSTRACT

This disclosure provides various embodiments of software for navigating through components. In one aspect, the software associates a transactional process with a first component, triggers navigation from the first component to a second component, and performs the transactional process associated with the first component upon triggering navigation from the first component to the second component. In some implementations, the transactional process comprises validating modifications made to the data of the first component. In other implementations, the transactional process further comprises saving the modifications to the data of the first component if the validation is successful, and if the validation is unsuccessful, not saving the modifications to the data of the first component.

19 Claims, 9 Drawing Sheets

OTHER PUBLICATIONS

Akadia.com. "Concurrent Version System CVS". Aug. 28, 2005. All pages.*

Booch et. al. "Collaborative Development Environments". Oct. 28, 2002. All pages.*

"Dependencies Between Development Components," [online], <http://help.sap.com/saphelp_nw04/helpdata/EN/c0/2a6a09e6b9e54aace2adf40260337e/frameset.htm>, retrieved Apr. 6, 2010, 2 pages.

"Nesting Development Components," [online], <http://help.sap.com/saphelp_nw04/helpdata/EN/66/601ebaa56a984787d38ce3a46d2300/frameset.htm>, retrieved Apr. 6, 2010, 2 pages.

"Development Components—Concepts," [online], <http://help.sap.com/saphelp_nw04/helpdata/EN/49/d0ae143e94774a9423ca8c009dc76f/frameset.htm>, retrieved Apr. 6, 2010, 2 pages.

"Public Parts," [online], <http://help.sap.com/saphelp_nw04/helpdata/EN/e2/084c16e1e4d545bb94c2bc8379d5f8/frameset.htm>, retrieved Apr. 6, 2010, 2 pages.

"Purposes of Public Parts," [online], <http://help.sap.com/saphelp_nw04/helpdata/EN/80/096744c271f8408bae38a49d556c80/frameset.htm>, retrieved Apr. 6, 2010, 1 page.

"Public Parts Entities—Development Objects in Public Parts," [online], <http://help.sap.com/saphelp_nw04/helpdata/EN/02/6755bd296ade42931646f869b1fd15/frameset.htm>, retrieved Apr. 6, 2010, 2 pages.

"Public Part Entity Reference," [online], <http://help.sap.com/saphelp_nw04/helpdata/EN/8d/730b40c6c01961e10000000a155106/frameset.htm>, retrieved Apr. 6, 2010, 1 page.

"Context Node: Properties," [online], <http://help.sap.com/saphelp_nw04/helpdata/EN/7a/787e40417c6d1de10000000a1550b0/frameset.htm>, retrieved Apr. 6, 2010, 3 pages.

"Data Binding and Mapping," [online], <http://help.sap.com/saphelp_nw04/helpdata/EN/15/2bc83edf72e16be10000000a114084/frameset.htm>, retrieved Apr. 6, 2010, 2 pages.

"Controllers," [online], <http://help.sap.com/saphelp_nw04/helpdata/EN/eb/e1cb5eea012b4481f8077c6023a70e/frameset.htm>, retrieved Apr. 6, 2010, 2 pages.

"Use Dependencies," [Online], <http://help.sap.com/saphelp_nw04/helpdata/EN/09/bfd34b3a742a42a60a9ae93d09c1ff/frameset.htm>, retrieved Apr. 6, 2010, 1 page.

* cited by examiner

NAVIGATION THROUGH COMPONENTS

RELATED APPLICATION

This application claims the priority under 35 U.S.C. §119 of Provisional Application Ser. No. 60/841,860, filed Sep. 1, 2006.

TECHNICAL FIELD

This document relates to electronic data processing and, more particularly, to application programming for navigating through components.

BACKGROUND

Applications can be developed using various architectures, including, for example, a model-view-controller (MVC) architecture. The MVC architecture breaks an application into three separate parts—models, views, and controllers. Each model may have multiple views, where each view displays information about the model to a user. A controller of the model receives events, for example, raised by a user interacting with a view to manipulate the model. Each model may have multiple controllers and a controller may relate to multiple views. When changes occur in the model, the model updates its views. Data-binding may be used for data transport between the view and its model or controller. For example, a table view may be defined to display data of a corresponding table that is stored in the model or controller. Further, the table view may be replaced by a further view, such as a graph view, that binds against the same table.

Application development is often divided into two general stages: design time and runtime. With respect to the MVC example above, the design time stage may include steps such as designing the views of an application (including the layout of the user interface elements in each view), modeling of the application flow (including the selection of the views to be displayed), designing one or more models, and creating and editing other application elements, such as controllers and contexts. The design time stage may also include the binding of user interface (UI) elements within views to data sources that are defined in a data type repository. Information created during the design time may include application metadata. Application metadata may be stored in a metadata repository, and used as input to the runtime process. During the runtime process, the application metadata may be used to generate the actual runtime code of an application. In some implementations, the application metadata is platform independent, and the generated runtime code is platform specific. The runtime code may be executed in a runtime environment that provides a general framework for running applications. For example, a runtime environment may provide services for deploying and maintaining applications, as well as features such as a caching mechanism that may be used to improve performance, and automatic input assistance and default error handling that is based on the declared application metadata.

SUMMARY

This disclosure provides various embodiments of systems, methods, and software facilitating navigation through components. In one aspect, the software associates a transactional process with a first component, triggers navigation from the first component to a second component, and performs the transactional process associated with the first component upon triggering navigation from the first component to the second component. In some implementations, the transactional process comprises validating modifications made to the data of the first component. In other implementations, the transactional process further comprises saving the modifications to the data of the first component if the validation is successful, and if the validation is unsuccessful, not saving the modifications to the data of the first component.

While generally described as software, some or all of these aspects may be further included in respective systems or other devices for executing, implementing, or otherwise supporting a suitable software application. The details of these and other aspects and embodiments of the disclosure are set forth in the accompanying drawings and the description below. Other features, objects, and advantages of the various embodiments will be apparent from the description and drawings, and from the claims.

DETAILED DESCRIPTION

Figure 1:
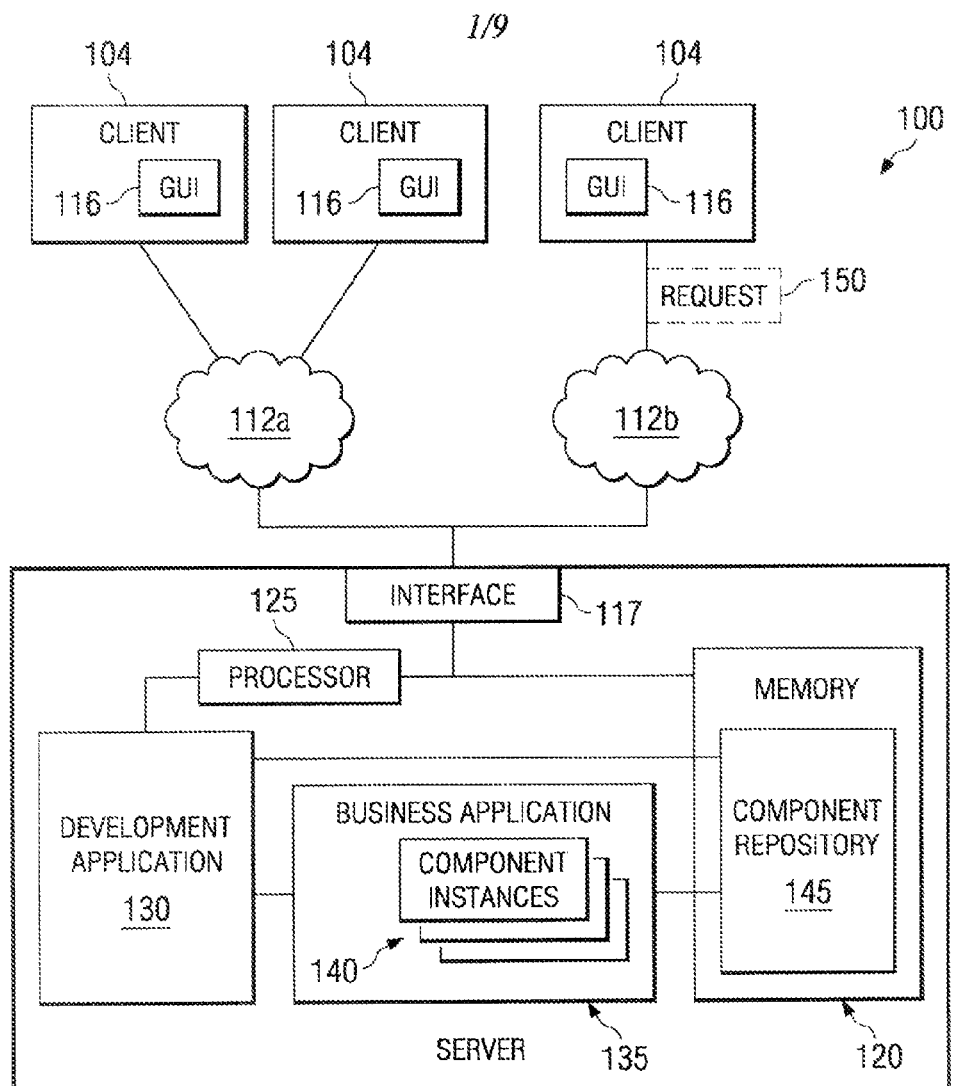
FIG. 1 illustrates an environment implementing a method for navigating through components according to a particular implementation of the present disclosure.

FIG. 1 illustrates at least a portion of an enterprise or data processing environment 100 implementing or facilitating the navigation through components. In accordance with particular implementations, illustrated environment 100 utilizes an example development application 130 that enables navigation through components. The development application 130 may be applicable to a variety of programming platforms, for example, Sun's Java or Microsoft's .NET. Regardless of the particular architecture that is used, it is often desirable to structure an application (including, for example, the models, views, and controllers that make up an MVC application) into reusable entities or components. The reusable components may be embedded by the application or by another reusable component. Environment 100 further allows application developers to create applications using instances of components 140 from within the component repository 145 where the business application 135, using transactional processes associated with individual component instances 140, may recognize navigation instructions and automatically process some or all of the data altered by a user and/or application during the navigation between one or more components. In some embodiments, the navigation instructions received by the business application 135 may be analyzed to automatically determine the type of processing for some or all of the data with which the user interacted. In some instances, the transactional processes associated by the business application 135 with individual components 140 may act to analyze the data to determine the correct handling methods for the updated data. The transactional process may perform a validation process and/or save, or may cause the business application 135 or other software to perform a validation and/or save. In still other embodiments, the user may explicitly cause processing to occur by providing processing instructions directly to the business application 135.

As such, the business application 135 may provide a technique for navigating through components while retaining some or all of the changes made by the various users of the applications to the data presented. In some cases, this component may contain objects like "views," "models," and "controllers." For example, navigation from a view set in a component A to a view set in component B may occur by triggering so-called "outbound plugs." The "outbound plug," attached to A, is typically linked to an "inbound plug" of B. Triggering the outbound plug automatically facilitates business application 135 to leave the view of A and to visualize the one from B. This A-view may be surrounded with or otherwise associated with a transactional process, so that when one leaves this view, a validation and a save of the work done on data in A could be done. Of course, the validation can lead to some error messages that may, in some cases, result in denying the navigation request. For instance, the component may represent one application unit, which may involve with some data, offering the possibility to view and/or to change it. Data may be shown as a table according to the Object Identification Pattern (OIP)/Object Data Pattern (ODP) pattern. The application unit where data can be changed can be triggered within a transaction. In the OIP sight, the developer may work with one line of a table at a time, which may mean changing to another line leads to a process of saving the data (beginning with a validation part). The developer may also save the work explicitly; moreover, there is typically the possibility to "go away" by clicking some other link in the menu, leading him to quit the current component.

Turning to FIG. 1, environment 100 may include or be communicably coupled with a server 102, one or more clients 104, and a network 112. The server 102 includes memory 120 and one or more processors 125 and comprises an electronic computing device operable to receive, transmit, process, store or manage data associated with the system. Generally, this disclosure provides merely one example of computers that may be used with the disclosure. As used in this document, the term "computer" is intended to encompass any suitable processing device. For example, the environment 100 may be implemented using computers other than servers, as well as a server pool. Indeed, the server 102 may be any computer or processing device such as, for example, a blade server, general-purpose personal computer (PC), Macintosh, workstation, Unix-based computer, or any other suitable device. In other words, the present disclosure contemplates computers other than general purpose computers as well as computers without conventional operating systems. The server 102 may be adapted to execute any operating system including Linux, UNIX, Windows Server, or any other suitable operating system. According to one embodiment, the server 102 may also include or be communicably coupled with a web server and/or a mail server.

Memory 120 may include any memory or database module and may take the form of volatile or non-volatile memory including, without limitation, magnetic media, optical media, random access memory (RAM), read-only memory (ROM), removable media, or any other suitable local or remote memory component. For example, the memory 120 may store classes, frameworks, applications, backup data, jobs, or other information that includes any parameters, variables, algorithms, instructions, rules, or references thereto. The memory 120 may also include any other appropriate data such as VPN applications, firmware logs and policies, firewall policies, a security or access log, print or other reporting files, HTML files or templates, and others. Illustrated memory 120 may contain, reference, or otherwise store a component repository 145 that stores one or more component instances 140. In other words, each logical component may have more than one instance 140 (or none if it is not currently utilized) across multiple applications such as, for example, illustrated business application 135.

Figure 2A:
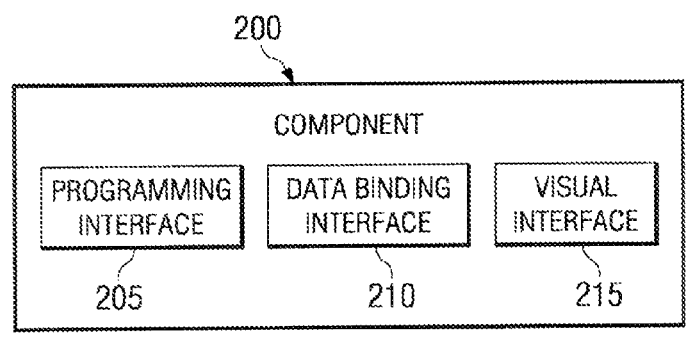
FIGS. 2A and 2B are block diagrams of a component in the illustrated environment of FIG. 1.

This MVC architecture generally allows developers to separate model functionality from the presentation and control logic that uses that functionality. Such separation allows multiple views to share the same enterprise data model, thereby facilitating support of multiple clients by perhaps making it easier to implement, test, and maintain certain MVC functionality. As described above, the models, views, and controllers that make up an MVC application may be structured as reusable components. FIG. 2A is a block diagram of one example of a reusable component 200 in an MVC application. As described earlier, the component 200 is a reusable entity providing functionality that may be used by many applications (or that may be used multiple times by the same application). Components 200 may be embedded in other components (or portions thereof) and may have any number (including zero) of visual representations. In other words, component 200 that is not associated with a visual representation may not be displayed. Components 200 may be embedded within the business application 135, another application, or even within another component. The application or component that embeds the component 200 may be referred to as a component embedder for the component 200 and the component 200 may be referred to as the embedded component. Components 200 may also be encapsulated in development components, and may be surrounded by a transaction process able to recognize navigation from one component or view to a second component or view.

The transactional process may be an agent, daemon, object, service, or other software that is reactive to certain events occurring in or upon its associated component. The transactional process may intercept signals and events concerning the associated component, or the component may actively supply the transactional process with notification and data regarding the signals and events it receives and/or transmits. The transactional process may be defined such that the transactional process may implement or cause certain events and/or actions to be taken when specific signals, commands, or events that relate to the associated component occur. For instance, when a user navigates to a component associated with a transactional process, the transactional process may begin to log the changes to the data stored within the component. In another example, navigation away from a component associated with a transactional process may activate certain save conditions such that the data of the component may be validated and saved when the navigation event is received by the transactional process. In such situations, the transactional process may cause outside agents or software to save and/or validate the data of the associated component, or the transactional process may perform the validation and/or save itself through its internal capabilities.

As illustrated, component 200 may provide three separate interfaces—a programming interface 205, a data binding interface 210, and a visual interface 215. The programming interface 205 may be used by the component embedder to interact with the component 200. In some cases, the component interface can be considered an active component. The component interface defines the component methods that may be visible to the component embedder and routes the visible method calls to one or more component implementations. The component embedder embeds the component 200 by programming to the programming interface 205, i.e., the component embedder may call the methods provided by the programming interface 205. In one implementation, the programming interface 205 may be provided by a controller, referred to as a component interface controller. Thus, a component embedder may interact with an embedded component 200 through the interface controller of the embedded component 200. The component 200 may also have one or more visual representations (herein referred to as views). A component embedder may access and use the views of the component through a visual interface 215. The data-binding interface 210 may be used by a component embedder to exchange data with the component 200.

In one implementation, the component 200 may include one or more controllers, one or more associated contexts, and one or more views. The controllers may be used to implement the logic of the component and the views may provide a visual representation of the component. Additionally, component 200 may include multiple types of controllers. The controllers implement event handlers that may be executed in response to an action performed by a user, e.g., pressing a button or making a menu selection. Each controller may be bound to an associated context. The context is a local data structure of a controller that stores data and state specific to the controller.

Figure 2B:
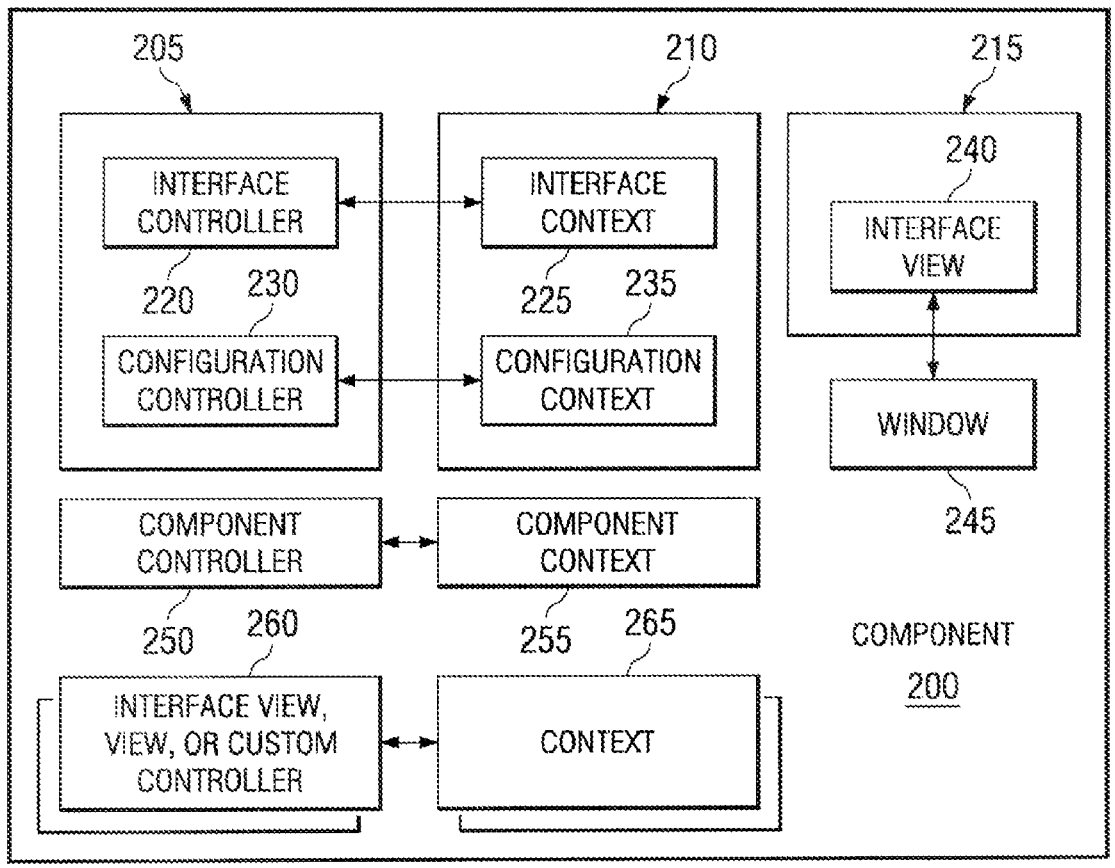

FIG. 2B illustrates further features of a component 200. The programming interface 205 for the component 200 includes an interface controller 220 and a configuration controller 230. The interface controller 220 provides references to methods that may be used (e.g., by a component embedder) to interact with the component 200. The configuration controller 230 provides access to configuration data for the component 200. The interface controller 220 has an associated interface context 225 that stores data and state of the interface controller 220. Likewise, the configuration controller 230 may have an associated configuration context 235 that stores configuration data for component 200. The component embedder may use the data-binding interface 210 to exchange data with the interface context 225 and the configuration context 235. The configuration context 235 may be initialized at runtime when an instance of the component 200 is created using configuration data provided by the component embedder. The configuration data stored in the configuration context 235 may include data used by the component embedder to customize the component 200.

Figure 3:
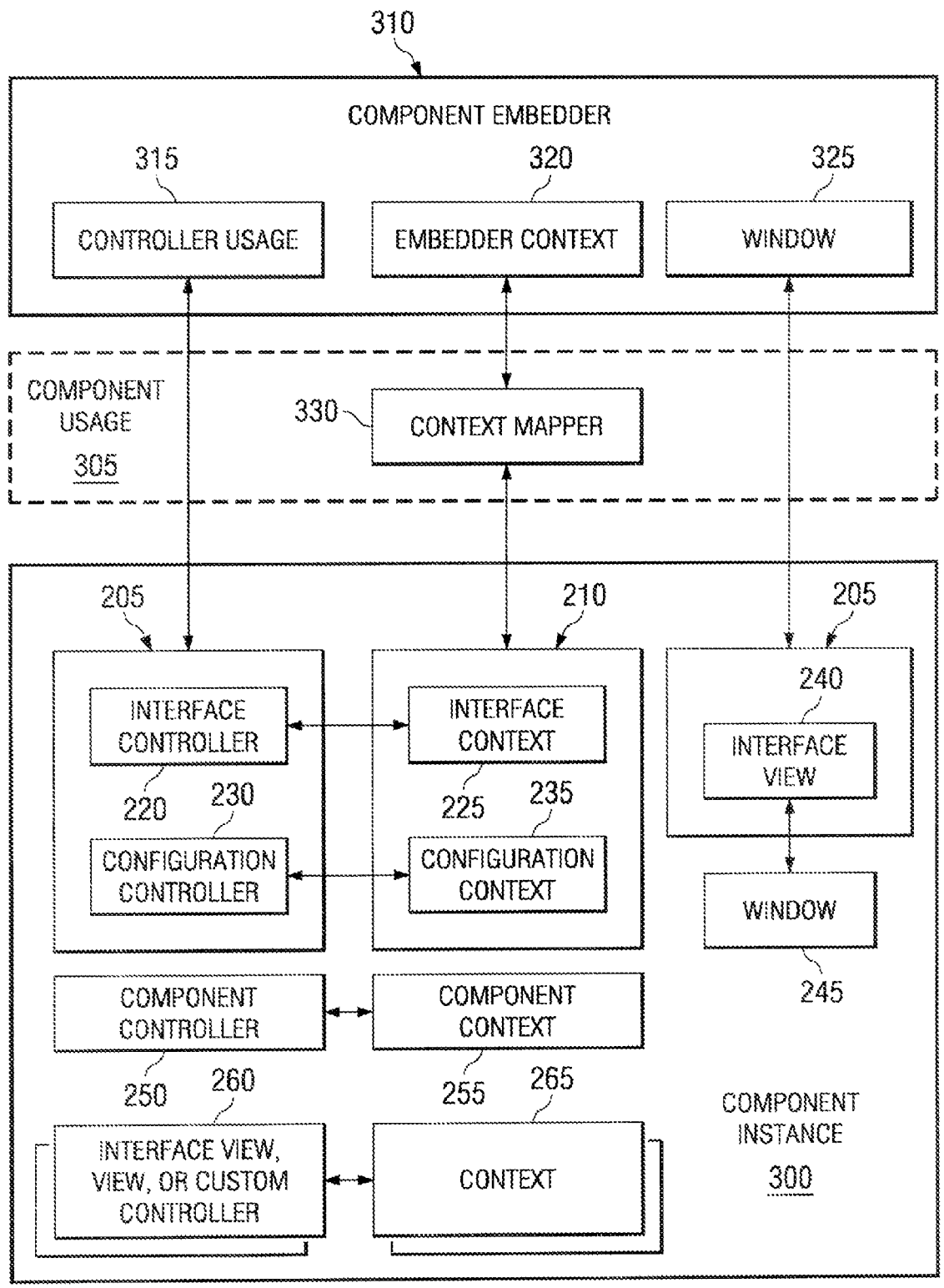
FIG. 3 is a block diagram of a system for accessing an embedded component instance in the illustrated environment of FIG. 1.

FIG. 3 is a block diagram of a component embedder 310 using an instance 300 of an embedded component 200, at runtime. The embedded component instance 300 is created at runtime. The embedded component 200 may be reusable and several instances 300 of the embedded component 200 may be used at the same time. In the implementation shown in FIG. 3, the development application 130 may provide the services necessary for managing multiple component instances 300. Services provided by the development application 130 include the creation of component instances and management of the lifecycle of component instances. Thus, neither the component embedder nor the embedded component 200 needs to include code for managing multiple component instances 300. Component usage object 305 is an object provided by the development application 130 to manage multiple component instances. Each component usage object 305 may be associated with a component.

Component usage object 305 provides life-cycle management of the associated component 200 by providing methods for creating and deleting component instances 300 of the associated component 200 at runtime. The life-cycle of the component instance 300 may be controlled by the component embedder 310. At design time, an application programmer programs using a programming interface 205 for a component 200 without specifying a particular implementation of the component 200. At runtime, the component embedder 310 creates the component instance 300, implementing the component programming interface 205 used by the component embedder 310 by calling the methods provided by the component usage object 305. The component usage object 305 responds to requests to create a component in the component repository 145 that implements the desired programming interface 205 and creates an instance 300 of the selected component 200. Alternatively, if the application programmer specifies a component implementation at design time, an instance 300 of the specified component may be created and used at runtime.

At runtime, the component usage object 305 may be used to access the programming interface 205 of the associated component. The component usage object 305 may also be used to manage event subscriptions for the associated component 200. In an implementation where a component embedder 310 may subscribe to events generated by embedded components, the component usage object 305 caches the event subscriptions for subscripting components (because the subscribing component may have not been created or because it may have been deleted). In such a situation, the event subscriptions may be delivered to the subscribing component when the subscribing component is instantiated. Component usage object 305 may include a context mapper 330 that maintains context mappings between the component embedder 310 and the component instance 300. The component usage object 305 may cache specified context mappings for a component that has not been instantiated, and create the specified context mappings for the component after the component has been instantiated.

Context is a local data structure for a controller that stores data and state specific to the controller. Controllers within a component, i.e., the interface controller, the configuration controller, the component controller, the custom controllers, and the view controllers, communicate data by mapping contexts. Similarly, the data-binding interface 210 allows the component embedder 310 to communicate data with the embedded component 300 by mapping the interface context 225 and the configuration context 235 using the context mapper 330.

Figure 4:
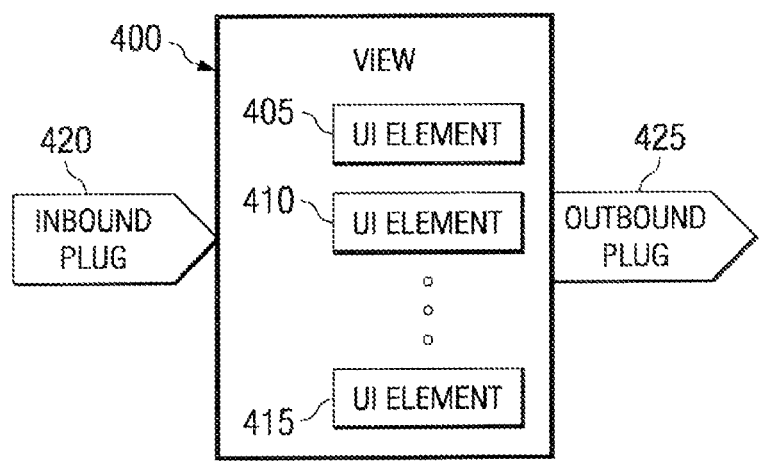
FIG. 4 is a block diagram of a view in the illustrated environment of FIG. 1.

FIG. 4 is a block diagram of a view 400. A visual interface of a business application 135 is made up of one or more views arranged in a specific layout. View 400 may specify a layout of at least one user interface element (UI) 405 and a view area. UI elements in a view may include, for example, buttons, labels, and menus. The view area may define the area to be occupied by the view 400 in a visual interface 215 embedding the view 400. The UI elements included in the view 400 may include Input UI elements, View UI elements, and Container UI elements. An Input UI element may be used to receive input from the user, e.g., a drop down menu, an input field, or a table UI element. The View UI element may be used to display application data, e.g., an image view, a text view, or a caption. The Container UI element may be used to include other views and UI elements, e.g., a scroll container UI element having a scroll bar or a container UI element specifying a layout for included views.

The visual interface 215 may have more than one view, of which only some views may be visible at any given time. The views that may be visible in the visual interface 215 may change, either automatically or in response to input from the user. Inbound plugs, outbound plugs, and navigation links are design time constructs that may be used by application developers to specify transitions between the views. Each view may have an inbound plug 420 and an outbound plug 425. At design time, each navigation link establishes a potential transition from the view with the outbound plug 425 to the view with the inbound plug 420. At design time, a transition from a first view to a second view may be specified by connecting the outbound plug 425 of the first view to the inbound plug of the second view. In some implementations, the first view may reside in a first component while the second view resides within a second component. The navigation links may be processed at runtime to cause the view transitions specified at design time. At runtime, based on user input or some programmed event, the application calls the outbound plug of the first view to cause a transition from the first view to the second view.

An inbound plug 420 may include an application specific event handler, and calling the inbound plug results in running the event handler for the inbound plug 420 prior to displaying the view 400 corresponding to the inbound plug 420. Navigation links are typically processed by calling the inbound plugs 420 connected to an outbound plug 425 when the outbound plug 425 is called. The event handler for an inbound plug 420 may call the outbound plug 425 for the view corresponding to the inbound plug to cause other views connected to the outbound plug 425 to be displayed. The application can use the event handler for the inbound plug 420 to initialize the corresponding view, e.g., the corresponding view may be initialized based on why the view is being displayed.

The view 400 may have an associated view controller that includes the event handlers associated with the inbound plug 420. The view controller may also contain event handlers for the UI elements in the view as well as the presentation logic for the view.

The business application 135 or a component 200 may specify any number of views at design time, any of which may be displayed at runtime. The set of views that may be displayed is referred to as the view composition, or window 245 of FIG. 2B. Each component may have one or more windows associated with an interface view. By embedding the interface view at design time, users of the business application 135 may see the corresponding view composition, or window, at runtime. A view assembly is the set of views that are actually displayed at runtime. The view assembly, for an application or a component, consists of views in the view composition that are selected for display at a certain point in time. When a navigation is processed at runtime, a particular view in the current view assembly may be replaced by one or more destination views from the view composition, which would be tracked or otherwise monitored by the transactional process.

Returning to FIG. 1, illustrated server 102 also includes a processor 125. The processor 125 executes instructions and manipulates data to perform the operations of the server 102 such as, for example, a central processing unit (CPU), a blade, an application specific integrated circuit (ASIC), or a field-programmable gate array (FPGA). Although described as a single processor in the server 102, multiple processors 125 may be used according to particular needs and reference to processor 125 is meant to include multiple processors where applicable. In certain embodiments, the processor 125 executes business application 135 and development application 130.

At a high level, business application 135 is any application, program, module, process, or other software that may execute, change, delete, generate, or otherwise request or implement batch processes according to the present disclosure. In certain cases, environment 100 may implement a composite application 135. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET. Further, while illustrated as internal to server 102, one or more processes associated with application 135 may be stored, referenced, or executed remotely. For example, a portion of application 135 may be a web service that is remotely called, while another portion of application 135 may be an interface object bundled for processing at remote client 104. Moreover, application 135 may be a child or sub-module of another software module or enterprise application (not illustrated) without departing from the scope of this disclosure. Indeed, application 135 may be a hosted solution that allows multiple parties in different portions of the process to perform the respective processing. For example, client 104 may access business application 135, once developed, on server 102 or even as a hosted application located over network 112 without departing from the scope of this disclosure. In another example, portions of business application 135 may be developed by the developer working directly at server 102, as well as remotely at client 104.

More specifically, business application 135 may be a composite application, or an application built on other applications, that includes an object access layer (OAL) and a service layer. In this example, application 135 may execute or provide a number of application services, such as customer relationship management (CRM) systems, human resources management (HRM) systems, financial management (FM) systems, project management (PM) systems, knowledge management (KM) systems, and electronic file and mail systems. Such an object access layer is operable to exchange data with a plurality of enterprise-based systems and to present the data to a composite application through a uniform interface. The example service layer is operable to provide services to the composite application. These layers may help composite application 135 to orchestrate a business process in synchronization with other existing processes (e.g., native processes of enterprise base systems) and leverage existing investments in the IT platform. Further, composite application 135 may run on a heterogeneous IT platform. In doing so, composite application 135 may be cross-functional in that it may drive business processes across different applications, technologies, and organizations. Accordingly, composite application 135 may drive end-to-end business processes across heterogeneous systems or sub-systems. Application 135 may also include or be coupled with a persistence layer and one or more application system connectors. Such application system connectors enable data exchange and integration with enterprise sub-systems and may include an Enterprise Connector (EC) interface, an Internet Communication Manager/Internet Communication Framework (ICM/ICF) interface, an Encapsulated PostScript (EPS) interface, and/or other interfaces that provide Remote Function Call (RFC) capability. It will be understood that while this example describes the composite application 135, it may instead be a standalone or (relatively) simple software program. Regardless, application 135 may also perform processing automatically, which may indicate that the appropriate processing is substantially performed by at least one component of system 100. It should be understood that this disclosure further contemplates any suitable administrator or other user interaction with application 135 or other components of system 100 without departing from its original scope. Finally, it will be understood that system 100 may utilize or be coupled with various instances of business applications 135. For example, client 104 may run a first business application 135 that is communicably coupled with a second business application 135. Each business application 135 may represent different solutions, versions, or modules available from one or a plurality of software providers or developed in-house.

The development application 130 may be any software operable to invoke or execute certain described processes. In some implementations, the development application 130 may implement MVC technology to develop business application 135, or create and initialize components and component instances 140, among other functionality. Regardless of the particular implementation, "software" may include software, firmware, wired or programmed hardware, or any combination thereof as appropriate. Indeed, development application 130 may be written or described in any appropriate computer language including C, C++, Java, Visual Basic, assembler, Perl, any suitable version of 4GL, as well as others. For example, the development application 130 may help implement a business application 135, where the business application portions may be implemented as Enterprise Java Beans (EJBs) or the design-time components may have the ability to generate run-time implementations into different platforms, such as J2EE (Java 2 Platform, Enterprise Edition), ABAP (Advanced Business Application Programming) objects, or Microsoft's .NET. It will be understood that the development application 130 may not only include any number of sub-modules, such as applications and third party modules, but it may instead be a single multi-tasked module that implements the various features and functionality through various objects, methods, or other processes. While described as internal to the server, one or more processes associated with development application 130 may be stored, referenced, or executed remotely. For example, a portion of the development application 130 may be a local library or process, while another portion of the development application 130 may be an interface object bundled for processing at a remote client. In another example, the majority of processes or modules may reside—or processing takes place—on the client 104. Moreover, the development application 130 may be a child or sub-module of another software module or development environment (not illustrated) without departing from the scope of this disclosure.

Turning to specific examples, the development application 130 may, in some situations, support development kits that contain special tools dedicated to certain components. For example, a Mobile Development Kit may integrate tools required to help build and test mobile applications for PDAs and laptops. The development application 130 may also include tools dedicated to constructing an application's user interface. Some kits may be language-agnostic and may support Java or ABAP, as well as other programming languages. In another example, the development application 130 may be the technical foundation for enterprise mobility within another development studio and provide the technology that powers composite applications for a mobile business. With this development application 130, the business may mobilize quickly, taking advantage of existing IT infrastructure and extending tried-and-true business processes within and beyond enterprise boundaries. This example development application 130 may comprise three mobile client technologies to enable standardized mobile business solutions as well as customer-specific developments. These clients may be optimized for specific user roles and target devices. For example, the modules may include:

Mobile Java client: optimized for personal digital assisted (PDA) or handheld devices that display occasionally connected applications, such as mobile asset management;

Mobile .NET client: designed for Microsoft Windows-based devices that display occasionally connected CRM field applications with a rich function set; and/or Mobile browser client: designed for mobile devices that are connected to a Web server using a technology such as WAP, wireless LAN, Bluetooth, and GPRS.

As an integrated component of another development studio or environment, the development application 130 may potentially leverage the overall platform benefits. For example, business application 135 may operate in both connected and disconnected modes because development application 130 may provide a local run-time environment (not illustrated) that may allow employees to perform their jobs whether disconnected or connected to the systems at their main office. With solutions powered by this development application 130, employees can store data offline on their mobile device and then synchronize information on back-end systems as needed. This development application 130 may provide a mobile development kit that helps developers build and customize mobile solutions that are tightly integrated with the back-end system. The development application 130 may also provide a console that enables system administrators to centrally manage mobile solutions and infrastructure. While the above-mentioned client technologies may be included, the foregoing does not represent an exclusive list of possible modules for customer-specific developments. Put simply, the development application 130 may comprise any suitable technology that can implement component or model-view-controller technology or concepts. Specifically, development application 130 may reduce coding, increase design capability, and increase development productivity through support of both model-centric and code-centric development techniques. In other words, it often supports a component-centric development paradigm for better reusability and the MVC design pattern for better scalability. In some cases, development 130 separates the underlying application from user interface client technologies such as Web, rich clients, mobile devices, and others. Moreover, it may provide a data dictionary for the central definition of data types and database tables that can be used for layers of application development, such as presentation, business, and persistence layers.

Figure 5:
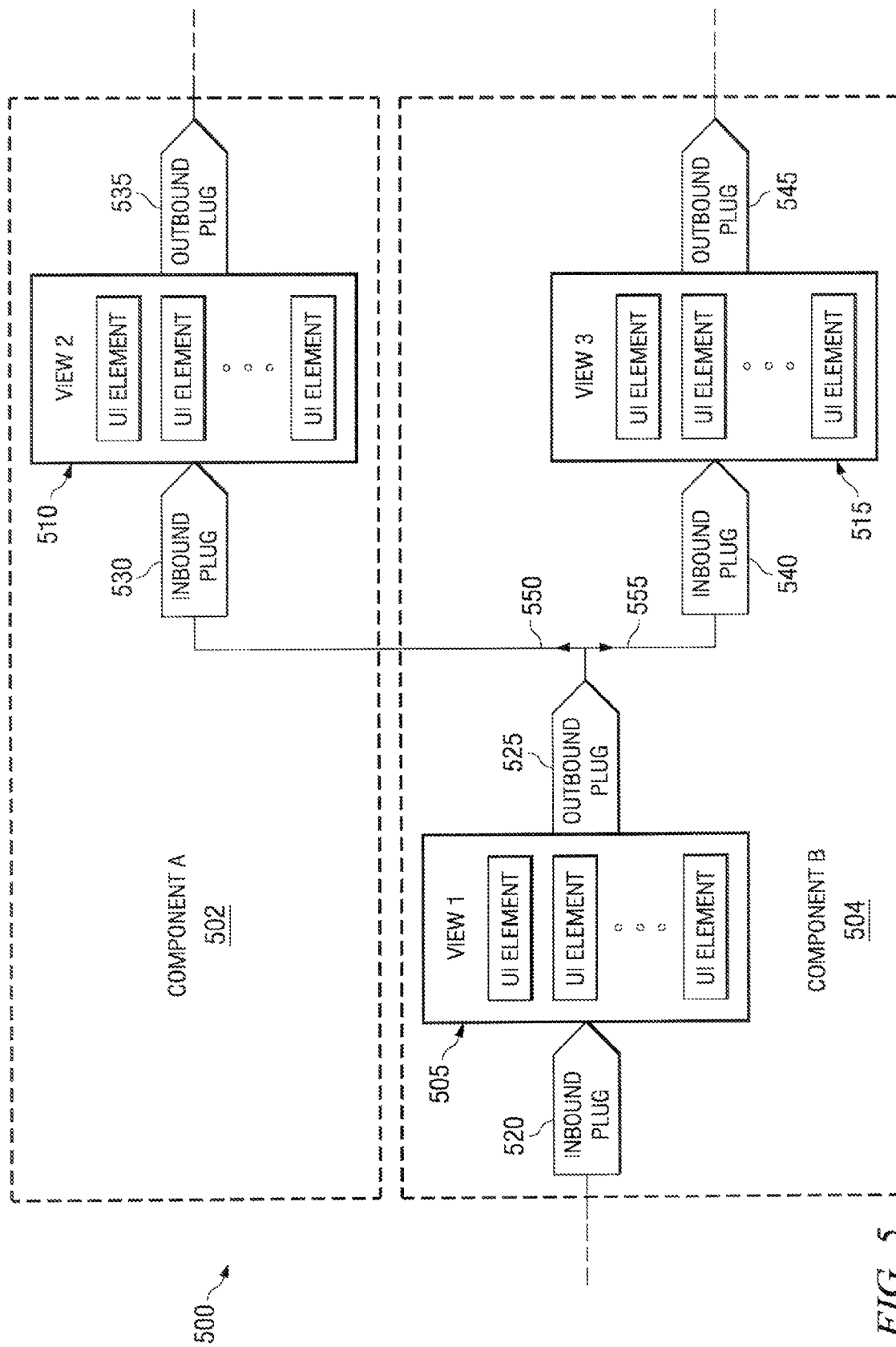
FIG. 5 illustrates a visual interface with multiple views in a plurality of components that are linked together using navigation links within the illustrated environment of FIG. 1.

FIG. 5 illustrates a visual interface with multiple views that may be linked together using navigation links. Each navigation link connects an inbound plug to an outbound plug. The view area 500 includes three views, 505, 510, and 515, of which view 505 is currently displayed in the view area 500. In the implementation of FIG. 5, view 505 and view 515 are views of component 504, while view 510 represents a view within component 502. A navigation link originating from an outbound plug within a first component may trigger the inbound plug of a view in a second component. View 505 has inbound plug 520 and outbound plug 525, view 510 has inbound plug 530 and outbound plug 535, and view 515 has inbound plug 540 and outbound plug 545. Outbound plug 525 is connected to inbound plug 530 by a navigation link 550, and outbound plug 525 is connected to inbound plug 540 by a navigation link 555. If view 505 activates outbound plug 525 by triggering the specified event for the outbound plug 525, views 510 and 515 are displayed in the view area 500 instead of the view 505.

Applications may make use of components that contain view compositions, or windows 245. Components may embed other components such that a first component may interact and make use of a second, embedded, component. The view composition of the first component may include views of the second component. Similarly, the view composition of the application may include views of the components used by the application. In addition, an application developer may design application specific views that may be part of the application's view composition.

Returning to FIG. 2B, a component developer designates one of the views in the view composition of the component as an interface view 240. The interface view 240, and the associated inbound plug and outbound plug, are the visual interface for the component 200. At design time, the component embedder may use navigation links to specify view transitions to the interface views 240 of embedded components 200 like any other view in the view composition of the component embedder. A component may present more than one visual interface by defining more than one interface view.

Each view has a view controller 260 and a view context 265 associated with the view controller 260. The view controller 260 implements presentation logic implemented by the view such as triggering events in response to user interaction with UI elements in the view. The view context 265 stores data and state associated with the view controller 260. The view context 265 may be used to communicate data between the view and any controller of the component 200 by mapping the view context to the context of the controller.

Component 200 may also include a component controller 250 that implements common functionality required by views implemented by the component 200. The component controller 250 may receive control when the component 200 is instantiated, after the component instance has been initialized. The component 200 may also include one or more custom controllers 260, and associated contexts 265. The custom controllers 260 and associated contexts 265 may be used to implement and structure functionality and data storage of the component 200.

The component embedder interacts with the embedded component 200 by using the programming interface 205, the data binding interface 210, and the visual interface 215. The embedded component 200 may interact with the component embedder by generating events. The component embedder may subscribe to events generated by the embedded component 200 and react to such events.

Figure 6:
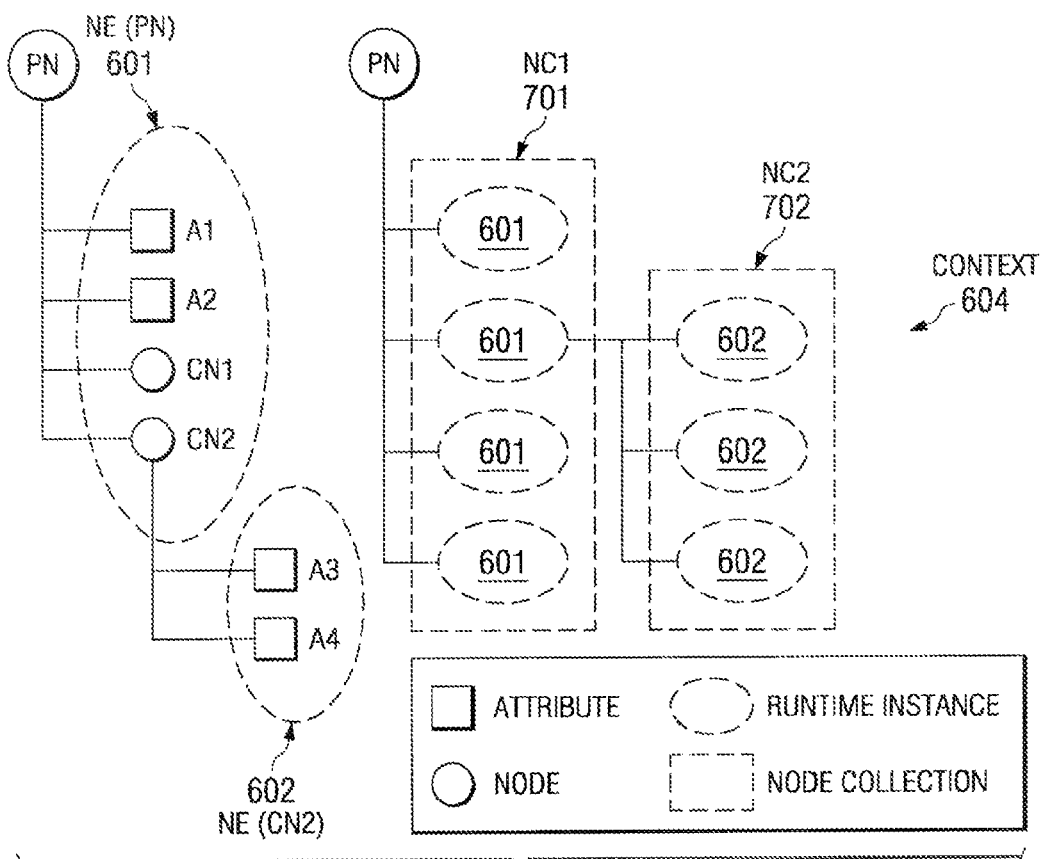
FIG. 6 illustrates an example of a structure of a particular context at design time and at runtime.

FIG. 6 illustrates an implementation of a context 604 at design time and at runtime. As shown in the example in FIG. 6, the design time context structure may be different from the runtime context structure. This design time context structure is a node hierarchy containing nodes and attributes. The root node of the node hierarchy represents the context itself. The child nodes of the root node may be defined by the application. Child nodes of the root node may be referred to as independent nodes. Child nodes of independent nodes depend on their corresponding parent node and can be referred to as dependent nodes.

Each node typically has a node type. Examples of node types are value nodes and model nodes. The value node may maintain, such as store and administer, its own application data (transient application data). The data may be, for example, scalar data, tables, or structures. The model node may include a reference to application data that persists in a corresponding model. The parent node may also have attributes. Each child node may include an arbitrary tree structure that includes further child nodes and/or attributes. Attributes are leaves in tree structure. Attributes represent, for example, scalar data types, such as strings and integers, or Java types (e.g., java.util.Date).

For example, in FIG. 6, at design time, the context 604 includes the independent node PN that includes the two attributes A1, A2 and that is the parent node of the dependent nodes CN1, CN2. The second dependent node CN2 has two further attributes A3, A4. This structure defines a first node element 601 for the parent node PN and a second node element 602 for the second child node CN2. The first node element 601 includes information about the context structure with regards to the parent node PN. In other words, it summarizes information that is available at the context structure level that is under the level of the parent node PN. The second node element 602 includes information about the context structure with regards to the second dependent node CN2. The context structure implies that the second node element 602 (which corresponds to the child node CN2) depends on the first node element 601 (which corresponds to the parent node PN).

At runtime, structure elements (e.g., nodes) may represent a set of data instances. Nodes provide type information about object instances that are maintained by the node. Each node may have a node collection, wherein each element of the node collection has the same node element type. For example, the example parent node PN corresponds to a first node collection 701 that includes multiple runtime instances of the first node element 601. Each runtime instance of the first node element 601 may have the attributes A1 and A2, a node collection corresponding to child node CN1, and a node collection corresponding to child node C2. An example of the latter node collection is shown in FIG. 6 as node collection 702, which contains multiple runtime instances of the second node element 602. The node collection may be empty, or may have at least one instance of the corresponding node element.

The node collection may have a cardinality and a node collection type, such as list, tree, set, or collection. The node collection cardinality (see table 2) and the node collection type (see table 1) may be declared at design time. An evaluation mechanism may be used to automatically evaluate the node collection of a child node at runtime when its parent node changes.

TABLE 1

Examples of node collection types

| Value | Meaning |
| --- | --- |
| Collection | forward-only iterator (cursor) without absolute positioning |
| Set | no duplicates, forward-only iterator without absolute positioning |
| List | duplicates allowed, position available, list iterator, absolute positioning (indexed access) |

The application may use the cardinality of a node collection to restrict possible operations on a node (e.g., prohibit indexed access to a node that has at most one node collection element).

TABLE 2

Examples of the cardinality of a node collection

| Value | Meaning |
|---|---|
| 0 ... 1 | node collection can be empty, contains at most one element |
| 1 ... 1 | node collection always contains exactly one element. |
| 0 ... n | node collection can be empty or contain any number of elements |
| 1 ... n | node collection always contains at least one element. |

The content of a node collection may be determined in various ways. Further, the node values of independent nodes may be set by initializers, event handlers or supply functions. A supply function may be called when a particular node is accessed. The node is accessed, for example, when the node is queried for its data by application code or by a UI element that is bound to the node.

Dependent nodes may get their values by using the supply function. For example, the node collection of a dependent node may become obsolete when a selection of its parent node changes (i.e., when a different element is selected from the node collection corresponding to the parent node). In this scenario, the dependent node may be recalculated, that is, the content of its node collection may be determined, on a subsequent access. In another example, a representation instance is created for each dependent node of a parent node. The values of the representation instances enable a "load data on demand" or an "unload data when not needed" mechanism. In this manner, memory may be used in an efficient manner.

The content of a node collection may also be explicitly set to a certain state, such as "invalid" or "unfilled." When the node that corresponds to the node collection is subsequently accessed, the node collection content is determined again. This may be used to force a re-read of modified data when the modification (e.g., in the model) was not visible to the application at runtime.

Figure 7:
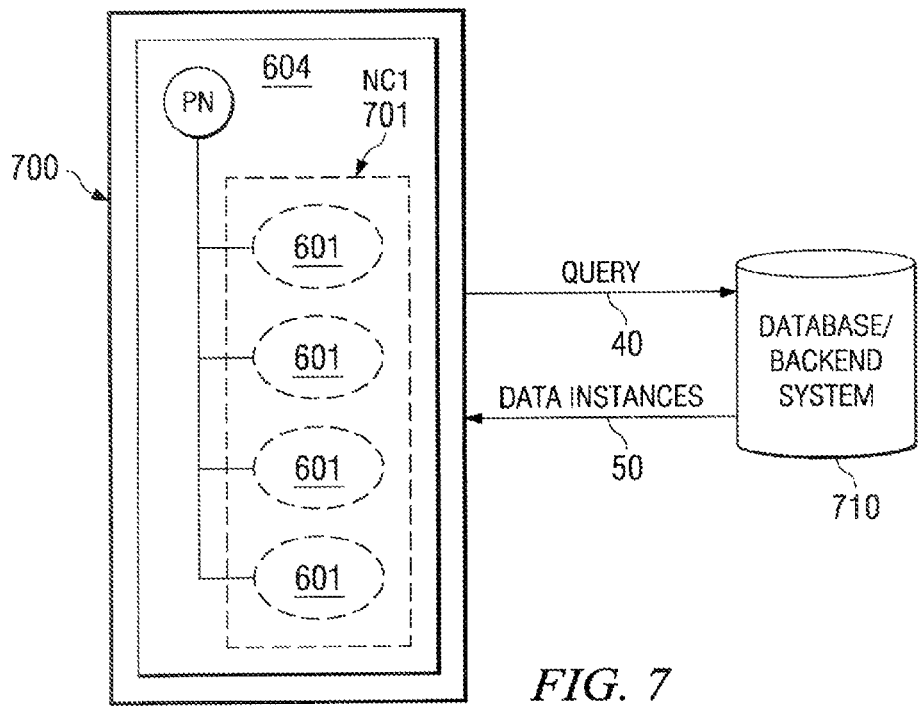
FIG. 7 illustrates the particular context at runtime as a set of data instances.

FIG. 7 illustrates the context 604 at runtime as a set of data instances. The nodes of the context at runtime represent a system-managed set of data instances (e.g., a java.sql.RecordSet). For example, data instances are returned from a database or backend system 710 in response to a query that is sent from the computer system 700 to the database/backend system 710 when a node is accessed, for example, by the business application 135. Accessing a node means requesting data from the corresponding model. This may result in a corresponding query request from the model to the database/backend system 710. Nodes provide type information about object instances that are maintained by the node. The type information may also be derived from the model. For example, if a parent node PN corresponds to a customer, its child node collection 702 may include all orders for that customer.

Returning to FIG. 1, the example server 102 may also include an interface 117 for communicating with other computer systems, such as the clients 104, over the network 112 in a client-server or other distributed environment. Generally, the interface 117 comprises logic encoded in software and/or hardware in a suitable combination and operable to communicate with the network 112. More specifically, the interface 117 may comprise software supporting one or more communications protocols associated with communications such that the network 112 or hardware is operable to communicate physical signals.

The network 112 facilitates wireless or wireline communication between the server 102 and any other local or remote computer, such as the clients 104. Indeed, while illustrated as two networks, 112a and 112b respectively, network 112 may be a continuous network without departing from the scope of this disclosure, so long as at least a portion of network 112 may facilitate communications between senders and recipients of requests 150 and results. The network 112 may be all or a portion of an enterprise or secured network. In another example, the network 112 may be a virtual private network (VPN) merely between the server 102 and the client 104 across wireline or wireless link. Such an example wireless link may be via 802.11a, 802.11b, 802.11g, 802.20, WiMax, and many others. In other words, the network 112 encompasses any internal or external network, networks, sub-network, or combination thereof operable to facilitate communications between various computing components in the system. The network 112 may communicate, for example, Internet Protocol (IP) packets, Frame Relay frames, Asynchronous Transfer Mode (ATM) cells, voice, video, data, and other suitable information between network addresses. The network 112 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, the network 112 may be a secure network associated with the enterprise and certain local or remote the clients.

The client 104 is any computing device operable to connect or communicate with the server 102 or the network 112 using a wireline or wireless connection. At a high level, each client 104 includes at least the GUI 116 and, in some cases, an agent, and comprises an electronic computing device operable to receive, transmit, process and store any appropriate data associated with the backup system. It will be understood that there may be any number of the clients 104 communicably coupled to the server 102. For example, the clients 104 may include one local client and two external clients to the illustrated portion of the network 112. Further, "the client 104," "developer," and "user" may be used interchangeably as appropriate without departing from the scope of this disclosure. For example, the developer may use development application 130 on a first client 104, while an end user may use business application 135 on a second client 104. Moreover, for ease of illustration, each client 104 is described in terms of being used by one user. But this disclosure contemplates that many users may use one computer or that one user may use multiple computers. As used in this disclosure, the client 104 is intended to encompass a personal computer, touch screen terminal, workstation, network computer, kiosk, wireless data port, smart phone, personal data assistant (PDA), one or more processors within these or other devices, or any other suitable processing device. For example, the client 104 may comprise a computer that includes an input device, such as a keypad, touch screen, mouse, or other device that can accept information, and an output device that conveys information associated with the operation of the server 102 or the clients 104, including digital data, visual information, or the GUI 116. Both the input device and output device may include fixed or removable storage media such as a magnetic computer disk, CD-ROM, or other suitable media to both receive input from and provide output to users of the clients through the display, namely the GUI 116.

GUI 116 comprises a graphical user interface operable to allow the user of the client 104 to interface with at least a portion of environment 100 for any suitable purpose such as to allow the user to navigate through the components within business application 135. Generally, the GUI 116 provides the particular user with an efficient and user-friendly presentation of data provided by or communicated within the system. In particular, GUI 116 may provide the user of business application 135 with access to data stored within memory 120. The GUI 116 may comprise a plurality of customizable frames or views having interactive fields, pull-down lists, and buttons operated by the user. These frames or views may be associated with specific component instances 140 such that the related data may be accessed and modified. In addition to manipulating data, other portions of the customizable frames or views may allow users to navigate between a plurality of views and/or components through user actions in the GUI 116. Navigation may present the user with new frames or views of a business application 135. Upon indicating a desire to navigate away from a first frame or window, event handlers within the component instances 140 of the business application 135 or other programming of the business application 135 may cause data associated with the first frame or view to be processed prior to presenting the new frame or view to the user via the GUI 116. Therefore, the GUI 116 contemplates any graphical user interface, such as a generic web browser, touch screen, or command line interface (CLI) that processes information in environment 100 and efficiently presents the results to the user. The server 102 can accept data from the client 104 via the web browser (e.g., Microsoft Internet Explorer or Mozilla Firefox) and return the appropriate HTML or XML responses using the network 112.

Figure 8:
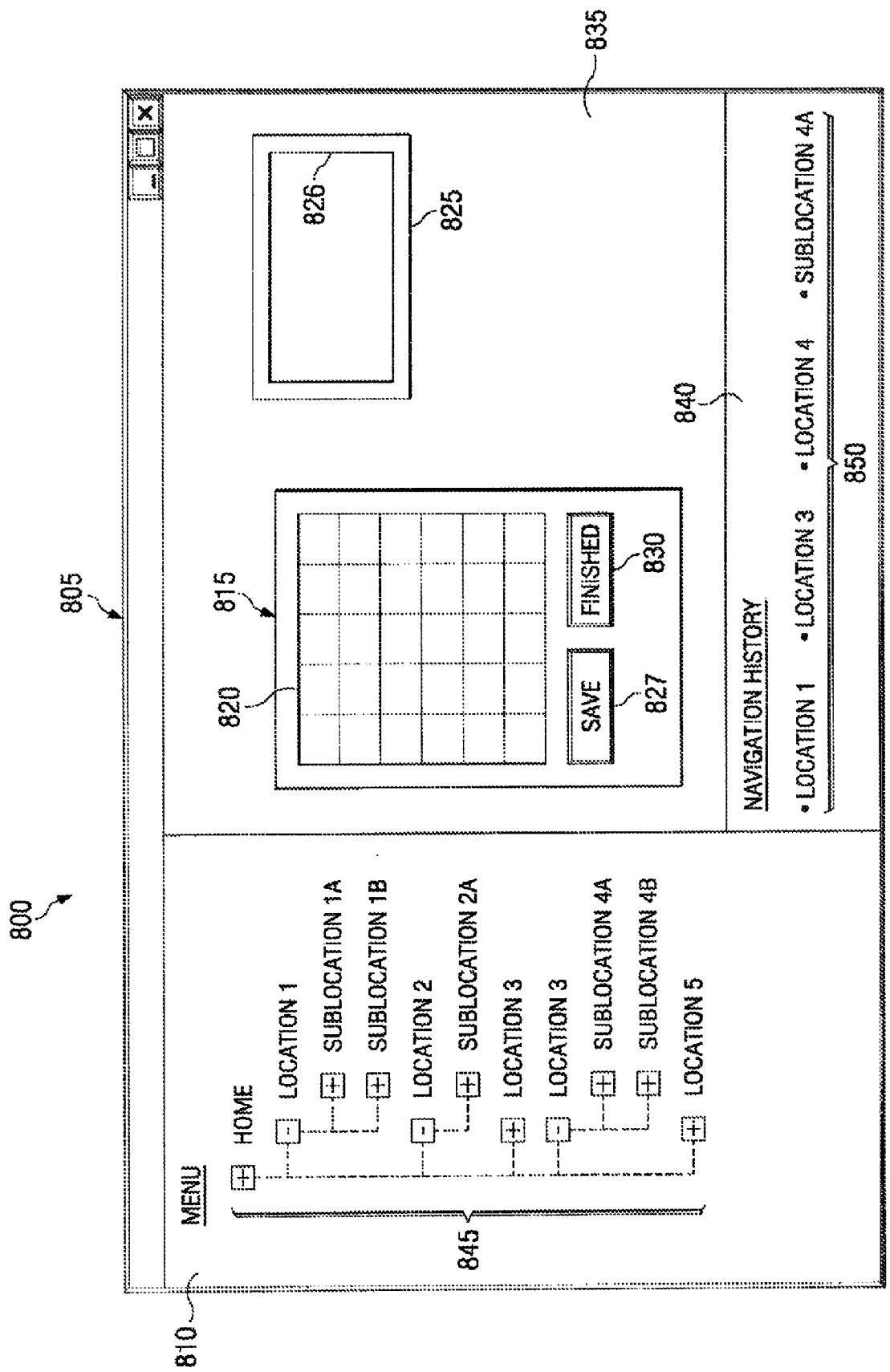
FIG. 8 illustrates a visual interface containing multiple views capable of enacting the steps for navigating through components of the process described in FIG. 10.

FIG. 8 is one embodiment illustrating the visual interface 805 that may be displayed in environment 100. The visual interface 805 may be composed of several distinct areas, or views. In this embodiment, the visual interface 805 is composed of a general menu 810, a navigation history menu 840, and a main view 835, which itself is composed of subviews 815 and 825.

Figure 9:
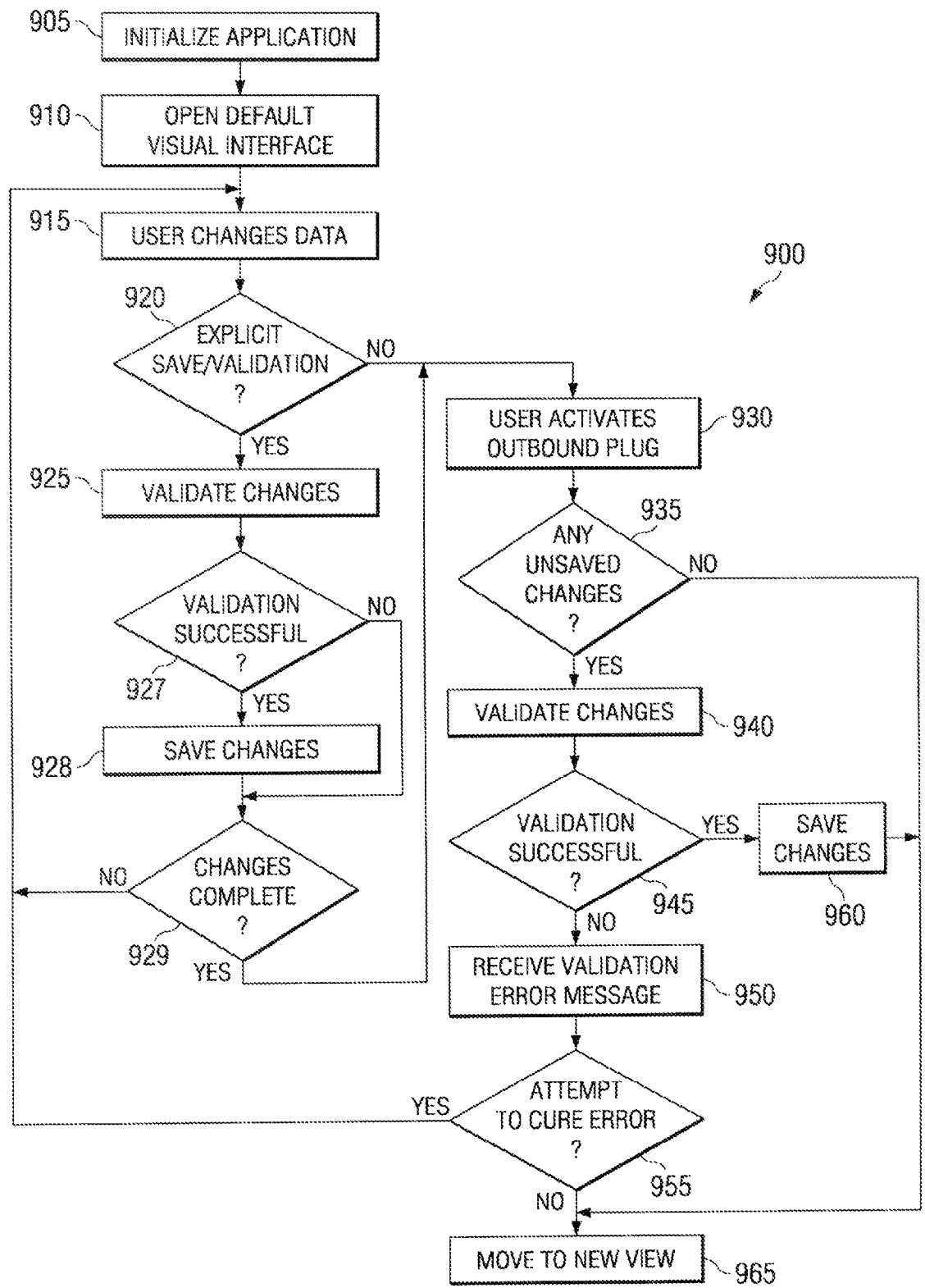
FIG. 9 is a flowchart diagram illustrating an example of the steps for navigating through components from the perspective of a client within the illustrated environment of FIG. 1.
Figure 10:
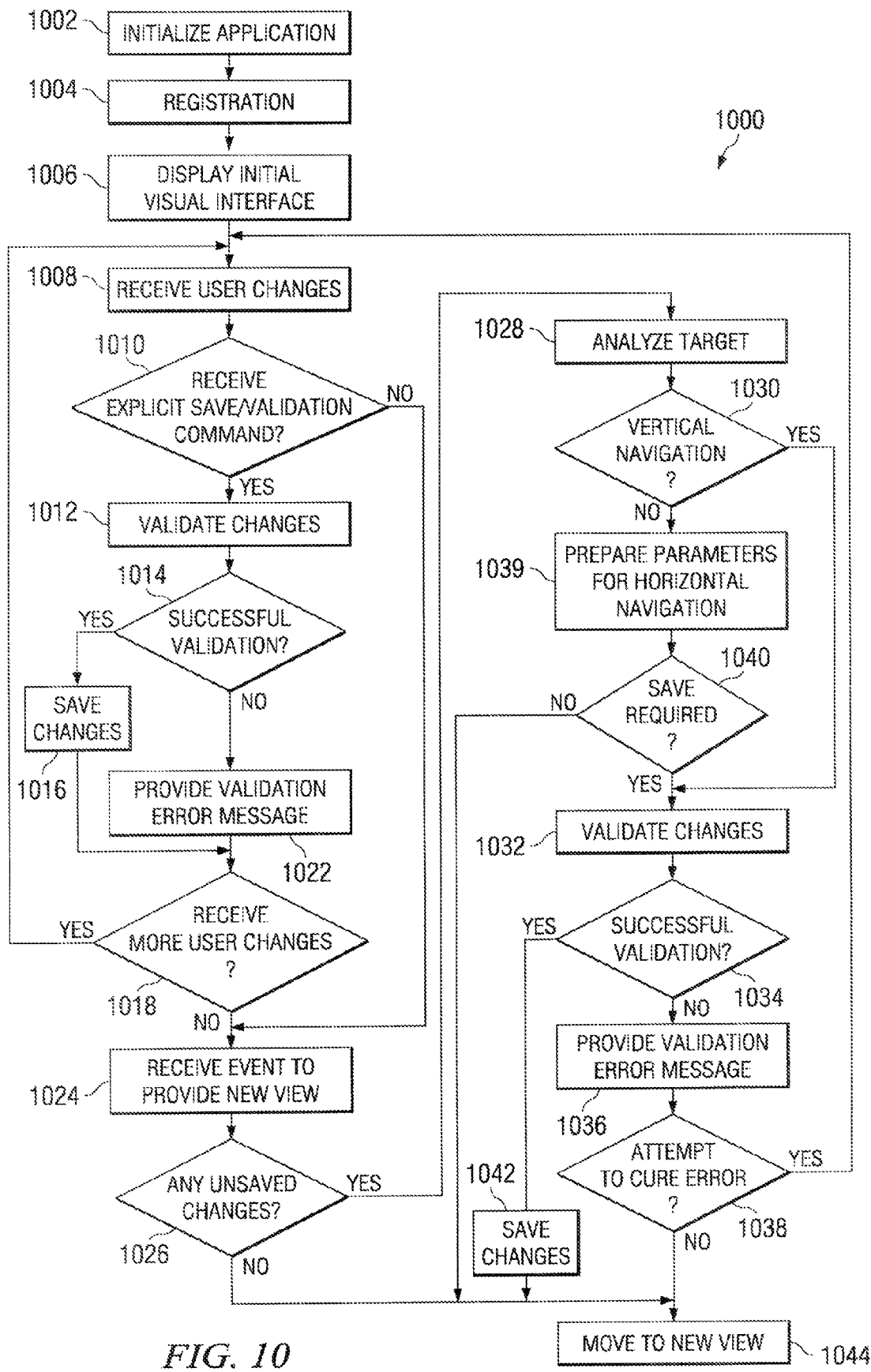
FIG. 10 is a flowchart diagram illustrating an example of the steps for navigating through components from the perspective of an application within the illustrated environment of FIG. 1.

The general menu 810 may be created by a manner similar to the process described in the descriptions accompanying FIGS. 9 and 10. For instance, an API or public part may be defined in the lowest level components of the application 135, where the programming in the API or public part may be used, and implemented in the topmost component, where the context is known. At runtime, the concrete implementing class of the topmost level may be registered to the lowest level components. This process is described above with regards to step 1004 in FIG. 10. Similarly, the navigation history menu 840 may be created in a similar process as described in FIGS. 9 and 10. The navigation history links 850 may represent the locations previously visited by the application 135. If one of the links 850 is activated, an outbound plug is triggered from the current view, navigating the application 135 to the specified location. In some embodiments, the parameters of the location from the previous visitation may be stored using context saving or other methods, such that the user 104 may view the former location in the same manner as when the user 104 originally navigated away. In this manner, data that was not previously saved explicitly by the user 104, or prior to outbound navigation by the application 135, may be restored.

In the present embodiment, subview 815 is embedded within main view 835. The subview 815 contains three UI elements. The first is a table 820 which may contain records or information relating to the application 135. The user 104 may have the ability to interact with the data to make any necessary or desired changes. The subview 815 contains two other UI elements, a button 827 labeled "Save" and a button 830 labeled "Finished." In this embodiment, the user 104 may indicate a desire to save any changes to the data by activating button 827. When user interaction is complete, the user 104 may activate the second button 830, "Finished," to notify the application 135 that any events based upon the completion of user interaction may be triggered. Both actions are governed by the methods detailed in FIGS. 9 and 10.

The final portion of the visual interface 805 is subview 825, which is also embedded within the main view 835. In the current embodiment, subview 825 contains a text box 826 for displaying information relating to the table 820 of subview 815. The text box 826 of this embodiment is not interactive. The data displayed is meant to describe the information displaying in the table 815, and is thus static. In other embodiments, the text box 826 may be an interactive element such that the user 104 may change the description of the table 820.

FIGS. 9 and 10 are flowchart diagrams illustrating example embodiments of methods 900 and 1000 for navigating through components from the perspectives of a user and application, respectively, within environment 100 of FIG. 1. While the flowcharts illustrate two particular embodiments, environment 100 contemplates using any appropriate combination and arrangement of logical elements to implement some or all of the described functionality.

In FIG. 9, the user 104 initializes the application 135 at step 905. Upon initialization, the user 104 may be presented with an initial visual interface for the application 135. This visual interface may include one or more views, each of which in turn may contain one or more UI elements such as tables, drop-down boxes, menus, or other elements. In one embodiment, the default visual interface may include one view displaying a table representing, for instance, financial data. In a second embodiment, in addition to the table, the default visual interface may also include a second view containing a text box with information related to the table's data.

At step 915, the user 104 may interact with the UI elements of the visual interface to change or update the data presented. In one embodiment, the data may only be initially changed in the local UI element. In still other embodiments, the data may be automatically updated to a persistent storage upon any changes being made. In the embodiment illustrated by the flowchart of FIG. 9, the data may not be saved in persistent storage until the user 104 takes some action to indicate an explicit validation and save at step 920. If the user 104 chooses not to explicitly save changes to data prior to navigating away from the current component, then method 900 will move to step 930 when the user 104 attempts to navigate away from the current visual interface. If, however, the user 104 does choose to explicitly save the changed data, method 900 will move to step 925 where the changes may be validated. In one embodiment, the view in which the user 104 modified the data may include another UI element, such as a button, with which the user 104 may activate a signal to the application 135 that a validation and save should be performed.

After indicating an explicit save should occur, the user 104 may wait for the application 135 to finish the validation of the data performed at step 925. The validation process may involve the application 135 checking the formatting, substance, or style of the new data against any requirements in place for the changed fields. At step 927, the application 135 determines whether or not the validation was successful. If successful, method 900 may save the local changes to persistent storage at step 928 such that the changes are available to other users or applications that access the data. Once the changes have been saved, at step 929 the user may choose to make more changes to the data, returning to step 915, or the user may be finished making changes and ready to navigate to another component or to another view within the component.

However, if validation was unsuccessful, method 900 moves to step 929 where the user 104 may elect to modify the data into an acceptable format or allow the changes to be erased and continue navigating to a new component or view. If the user 104 chooses to correct the errors, method 900 returns to step 915. In some embodiments, upon electing to modify the data into an acceptable format, the changed data may remain in the local environment after a failed validation. In other embodiments, the data may be reset to the original value, causing any changes to be made again. In some embodiments, changes that were validated may be saved while the unacceptable changes are removed. Additionally, some embodiments may provide error messages generated by the application 135 indicating to the user 104 what issues arose during the validation process.

At step 930, the user 104 may perform an action corresponding to the activation of an outbound trigger of the current view in order to navigate to a new view. In one embodiment, this trigger may be activated by using an embedded UI element such as a button, menu, or link. In other embodiments, focusing the application 135 on another of the views within the interface may cause the activation. In some embodiments, changing the lead selection of a table, such as by changing the selected row, may also initiate the save and validation process for any data that has not previously been explicitly saved. Step 935 determines whether any unsaved changes to the data remain upon navigating to a new view. The user 104 may or may not have already explicitly saved all of the changes to the data. Prior to navigating to the new view or component, step 935 ensures that any changes to the data requiring saving are appropriately stored. If no unsaved changes remain, the method 900 moves to step 965 where the application 135 navigates to the new view specified by the outbound trigger without further action.

However, if unsaved changes to data remain, at step 940 the application 135 attempts to validate the data. In one embodiment, validation may be performed in a similar manner as in step 925. In other embodiments, validation may be performed differently than the previous validation. After attempting to validate the new data, step 945 determines whether or not the validation was successful. If successful, method 900 may move to step 960 where the previously unsaved changes are stored in the persistent storage for other users and applications accessing the data. If validation is unsuccessful, however, an error message may be provided to the user 104 at step 950. The error message may be a pop-up notification, a visual indication on the screen as to which portions of the data are unacceptable, or another notification technique. Once the user 104 has been notified of the error, at step 955 the user may elect to correct the error by attempting to correct the data, or chose to continue on with the navigation without storing the changes. If the user 104 chooses to attempt correction of the errors, the method 900 returns to step 915, wherein the user 104 modifies the data to conform to the application's 135 requirements. The user 104 would then continue through method 900 as normal, with the opportunity to explicitly save the changes at step 920 before attempting to navigate away from the current visual interface. If the user 104 chooses not to correct the data at step 955, the application 135 would allow navigation to the new view to occur at step 965 without saving the changes. In some embodiments, any changes made by the user 104 would be lost. In other embodiments, changes that were successfully validated may be saved, while those failing the validation step are not. After completing the method 900 for a single set of data, the user 104 may perform the same method in the view being navigated to, or in another portion of the visual interface.

FIG. 10 illustrates example method 1000, the method of navigating through components from the point of view of the application 135. Similar to method 900, method 1000 begins with the initialization of the application 135 at step 1002. Step 1004, occurring at runtime for some implementations, allows the visual interface's topmost component to register, or provide a reference of itself, with the internal navigation processes and components. To further understand the registration of components at step 1004, registration may be understood by reference to the components illustrated within FIG. 11. First, screen1 1115, a view or visual interface of a first component, may be encapsulated in development component DC0 1110. Development component DC0 1110 is surrounded by a transactional process such that when the application 135 is navigated away from screen1 1115, the transactional process recognizes the navigation to another component or screen and causes the steps of method 1000 to continue. Because development component DC0 1110 exists at the logically highest level of the block diagram, it may be considered the topmost component.

Figure 11:
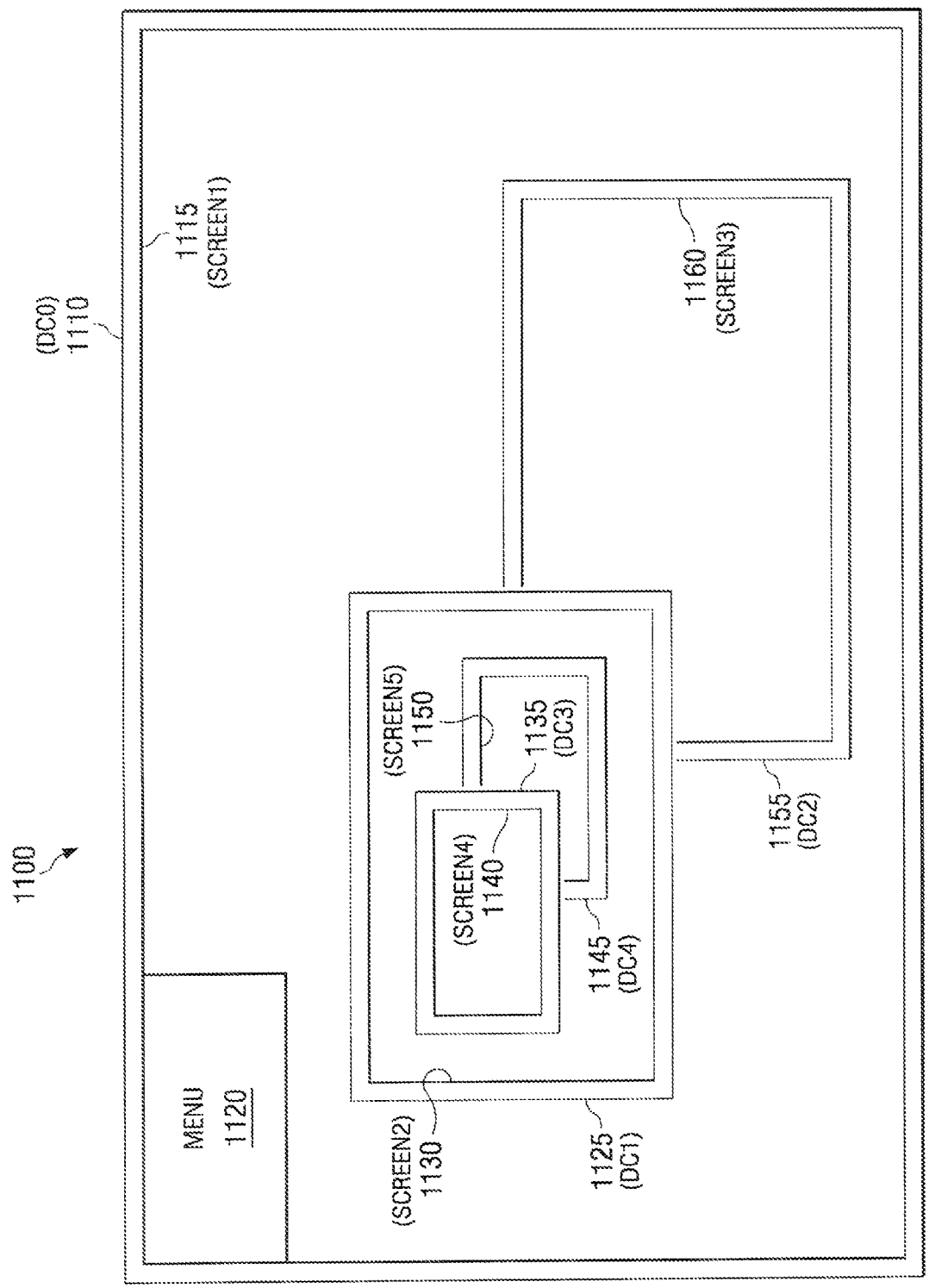
FIG. 11 is a block diagram illustrating one implementation associating transactional processes with components within the illustrated environment of FIG. 1.

As previously described, components may be embedded, or nested, within other components. FIG. 11 illustrates several components embedded within DC0 1110. DC1 1125 (encapsulating a component having screen2 1130) and DC2 1155 (encapsulating a component having screen3 1160) represent two components embedded within DC0 1110 at a second level. Within DC1 1125, two more components are embedded at a third level, DC3 1135 (encapsulating a component having a screen4 1140) and DC4 1145 (encapsulating a component having a screen5 1150). Similar to DC0 1110, each of these components and their related screens are encapsulated by a transactional process that identifies when the application 135 navigates from that component or view to another component or view. Each component, including DC0 1110, may contain a plurality of outbound plugs that allow for user navigation to one or more related components or views. By triggering these outbound plugs, navigation to those components or views may be implemented.

Two types of navigation may occur within the components of FIG. 11, namely vertical and horizontal. One example of vertical navigation can be navigation occurring by a triggering of an outbound plug from the general menu 1120. The general menu 1120 may be defined in a logically higher component DC0 1110 and may be located within a view of DC0 1110. Further, the general menu 1120 can be also declared within the lower level components as well. In the embodiment of FIG. 11, the menu 1120 is located within screen1 1115. The general menu 1120 may include existing outbound plugs such that by using the menu, destinations within the application 135 may be reached by activating the associated plug. As mentioned, registration occurs at step 1004 of method 1000. This registration process often involves registering the logically higher (in this case topmost) component, DC0 1110, with the logically lower components such that components and their views may access the general menu 1120 as well as the other navigational aspects of the topmost component. In this manner, navigation may be triggered from any component, due to each component's reliance on the reference to the topmost component. In one embodiment, referring the navigational capabilities of the topmost component to the lower components may be performed by declaring a public part at the topmost component containing the required actions, and then creating dependencies upon that public part at the lower components. In another embodiment, an application programming interface (API) may be defined in the lowest component, where it is used, and implemented in the highest level component. At runtime, the concrete implementing class of the highest level component may then be registered to the lowest component such that the navigation process is available to the lowest component. In one embodiment, the following may represent the API listing:

```
public interface INavContext {
    public DelegatingView getDelegatingtView( );
    public IWDMessageManager getMessageManager( );
    public IWDTestAccessor getTextAccessor( );
    publicIWDAbstractViewInfo getViewInfo( );
    public IWDViewController getViewController( );
    public IWDNodeElement currentContextElement( );
    public boolean isVerbose( );
    public void setVerbose(Boolean b);
    public IWDWindowManager getWindowManager( );
    public IWDControllerInfo getControllerInfo( );
    public IWDText getIWDText(String string);
    public IWDMessage getIWDMessage(String string);
}
```

The second type of navigation is horizontal navigation. Horizontal navigation can be considered as the navigation from one view (or component) to another using defined outbound plugs on the first view or component to navigate to the inbound plugs of a second view or component. One example of horizontal navigation in FIG. 11 would be navigation from DC3 1135 to DC2 1155, where triggering the outbound plug occurs by user's 104 activation of a corresponding UI element (i.e., button) in DC3 1135, or by some other event recognized by an event handler within the component DC3 1135 that corresponds to the navigation. During horizontal navigation, a user 104 or application 135 may need or desire to "navigate back" to a previously viewed component or view. This may be performed by passing information relating to the context of the current component or view to the component or view to which the user 104 or application is navigating, such as by the passing of parameters during the navigation. In this way, the information from the previous view or component may be available to the user 104 or application 135 even after navigating to the new view or component. The navigation history may be kept during navigation throughout the application 135, and in some embodiments, presented to the user 104 in a separate view within the visual interface. In one embodiment, the abstract class controlling navigation may be extended such that some specific information concerning the outbound plug that is to be triggered is provided along with the navigation. Some navigation methods may also be overwritten to alter the abstract class to provide for the solution. An example of the code enabling this embodiment may resemble the following:

```
final public class NavigateToOther extends ANavigator {
    final private static String ACTION =
        "Action_Other";
    final private static String PLUGNAME =
        "showOther";
    final private static boolean ISTRANSACTIONAL =
        false;
    final private static NavigateToOther instance;
    static {
        instance = new NavigateToOther( );
    }
    private NavigateToOther( ) { }
    static public NavigateToOther getInstance( ) {
        return instance;
    }
    public void navigateHorizontally(Map parameters) {
    }
    public void navigateVertically(Map parameters) {
    }
```

-continued

```
    public void navigateVertically( ) {
        navigateVertically((AValidator) null);
    }
    public void navigateHorizontally( ) {
        navigateHorizontally((AValidator) null;
    }
    public String getDisplayKey( ) {
        return ACTION;
    }
    public Boolean isTransactional( ) {
        Return ISTRANSACTIONAL;
    }
}
```

Returning to FIG. 10, method 1000 completes the registration process and provides an initial visual interface at step 1006. This visual interface may include one or more views from one or more components, each of which in turn may contain one or more UI elements such as tables, drop-down boxes, menus, or other elements. In one embodiment, the default visual interface may include one view displaying a table, along with a second view containing a text box with information related to the table's data. In still other embodiments, the initial visual interface may include a view containing a general menu for vertical navigation and/or a view for displaying the navigational history of the current session.

At step 1008, the application 135 may receive any changes made by user 104 interaction with the UI elements of the visual interface updating the data. The modified data may initially only be changed in the local environment. In the current embodiment, the data will not be saved to persistent storage until the application 135 receives some user command or signal at step 1010 indicating that the user 104 has chosen to perform an explicit validation and save of the modified data. In some instances, the application 135 may not receive a command from the user 104 to explicitly save the altered information. If this is the case, then at step 1024 the method 1000 may wait for the application 135 to receive an event indicating the user's 104 intention to navigate to a new component or view. If the application 135 does receive a command to explicitly save the changed data, the application 135 may attempt to validate the changes to the data at step 1012.

The validation process of step 1012 may involve the application 135 reviewing the formatting, substance, or style of the altered data to determine whether any requirements of the fields were violated. At step 1014, the application 135 may determine whether the validation was successful or not. If successful, the application 135 saves the altered data to the persistent storage at step 1016, such that the data may be accessible to the application 135, other applications, and any user attempting to access the information. If the validation is unsuccessful, the application 135 provides a validation error message at step 1022 providing the user 104 notification that the changes to the data may not be saved due to an error. After the data is saved at step 1016 or after the validation error message is provided at step 1022, the application 135 waits to receive any more user 104 changes to the data. If changes are made, the method returns to step 1008 to receive additional user changes. The application 135 may wait for more user changes until it receives a command or event indicating that the user 104 requests or requires a new view or component to be displayed at step 1024.

After receiving this command, the application 135 reviews the current data to determine whether or not any unsaved changes exist at step 1026. Unsaved data may be present when the user 104 has chosen not to explicitly save any changes. If no unsaved data is present, the method moves to step 1044 where the application 135 navigates to a new component or view. If unsaved data does exist, it should not be discarded when the user 104 navigates away from the current component or view. In order to ensure that the proper saves are made, the application 135 analyzes the intended target of the navigation at step 1028 to determine the proper actions to take. Application 135 determines whether the requested or required navigation is a vertical navigation at step 1030. Vertical navigation is performed when the general menu 1120 is used to navigate to a specific component. In the embodiment of method 1000, vertical navigation may signify that work in the previous component is complete so that a validation and save process may be engaged. In alternative embodiments, vertical navigation may not automatically signal that the user 104 is finished manipulating the data such that it is ready to be saved, thus requiring additional user commands to perform a non-explicit save. If vertical navigation is detected, the method 1000 validates the changes to the data at step 1032. This validation may be performed in a manner similar to that of step 1012, or it may validate the data in a different manner. Regardless of the method used, at step 1034 the application 135 determines whether the validation was successful or not. If successful, the changes are saved at step 1042, and the navigation to the new view or component is performed at step 1044. However, if the validation was unsuccessful, the application 135 provides the user 104 attempting to navigate vertically with an error message indicating the reasons for failure of the validation. In the present embodiment, the application 135 provides the user 104 with an opportunity to return to the data and correct the errors found by the validation process at step 1038. If the user 104 elects to correct the data, the method 1000 returns to step 1008, wherein the application receives additional user changes. From there, the method 1000 continues as before. If, however, the user 104 elects to not cure the data, the application 135 may move to the next view or component without saving the data to the persistent storage. Any changes may be lost, and other users 104 or applications accessing the persistent data will not access the unsaved user 104 modifications.

Returning to step 1030, the application 135 may determine that the navigation requested or required is not a vertical navigation. In that situation, the navigation is horizontal navigation, and the application 135 prepares the relevant information regarding navigation history for transmission to the new view or component at step 1039. This step is performed to provide the user 104 with the ability to return to data when navigation was not meant to be a final action. For instance, some horizontal navigations may be to a help component. Leaving the current view or component may not mean that the user 104 wants to save and end the current work, but rather retrieve information from another source and then return to editing the data of the current view or component. In some embodiments, a "back" operation may be included in the new view or component such that the navigation history information provides the data needed to navigate back to the previous view with minimal effort. In some embodiments, a new view or component may provide a listing of the previous navigations along with outbound plugs to those previous locations provided with links.

After having prepared the navigation history information, the application 135 may determine whether a validation and save process should be implemented upon the current data set at step 1040. As mentioned above, some horizontal navigations may not be permanent navigations such that modifications to the data set are not complete. Different embodiments with different requirements may provide different rules for determining when a horizontal navigation should require the saving of modified data and when a save is unnecessary. If the save is deemed unnecessary, the application 135 simply navigates to the new view or component at step 1044. If a save is necessary due to the specific embodiment's requirements, the application 135 proceeds to validate the changes at step 1032. The data is validated, the validation is analyzed at step 1034, and the modifications are saved at step 1042 or rejected in step 1036 as in the vertical navigation situation described above.

While the preceding flowcharts and accompanying descriptions illustrate exemplary methods 900 and 1000, environment 100 contemplates using or implementing any suitable technique for performing these and other tasks. It will be understood that these methods are for illustration purposes only and that the described or similar techniques may be performed at any appropriate time, including concurrently, individually, or in combination. In addition, many of the steps in these flowcharts may take place simultaneously and/or in different orders than as shown. Moreover, environment 100 may use methods with additional steps, fewer steps, and/or different steps, so long as the method remains appropriate.

Although this disclosure has been described in terms of certain embodiments and generally associated methods, alterations and permutations of these embodiments and methods will be apparent to those skilled in the art. Accordingly, the above description of example embodiments does not define or constrain the disclosure. Other changes, substitutions, and alterations are also possible without departing from the spirit and scope of this disclosure, and such changes, substitutions, and alterations may be included within the scope of the claims included herewith.

What is claimed is:

1. A computer program product encoded on a non-transitory tangible storage medium, the product comprising computer-readable instructions for causing one or more processors to perform operations comprising:

presenting a view of a first component, the first component associated with a transactional process operable in part to identify navigation away from the view of the first component to a view of a second component, each component associated with a model-view-controller business application, the second component existing at a logically lower level in the application relative to the first component;

registering the first component with the second component at run-time to provide the second component with access to the first component's navigational processes upon navigation to the second component, wherein registering the first component with the second component at run-time comprises:

accessing at least one application programming interface (API) associated with the second component, the API exposing at least one method associated with navigation between components within the business application;

implementing the at least one API associated with the second component at the first component at design-time; and registering a concrete implementing class of the first component with each of at least one logically lower component including the second component at run-time, the first component's concrete implementing class associated with the API and providing the at least one method associated with navigation to each of the components within the business application;

automatically triggering navigation from the view of the first component to the view of the second component in response to an event using the at least one method associated with navigation implemented by the first component at design-time; and performing the transactional process associated with the first component upon triggering navigation from the view of the first component to the view of the second component.

2. The product of claim 1, wherein the transactional process comprises validating modifications made to data of the first component.

3. The product of claim 2, the operations further comprising:
wherein the validation is successful, saving the modifications made to the data associated with the view of the first component using the transactional process; and
wherein the validation is unsuccessful, rolling back the modifications made to the data associated with the view of the first component using the transactional process.

4. The product of claim 3, wherein the validation is unsuccessful, the operations further comprising generating an error message describing a basis for the unsuccessful validation.

5. The product of claim 1, wherein the navigation from the view of the first component to the view of the second component comprises navigation from a top-level menu associated with the business application to a logically lower component of the business application.

6. The product of claim 5, wherein the transactional process is performed when the transactional process is associated with the second component.

7. The product of claim 5, the operations further comprising automatically validating the modifications made to data associated with the view of the first component.

8. The product of claim 7, the operations further comprising:
wherein the validation is successful, saving the modifications made to the data associated with the view of the first component using the transactional process; and
wherein the validation is unsuccessful, presenting an error message based on the unsuccessful validation and rolling back the modifications made to the data associated with the view of the first component using the transactional process.

9. The product of claim 1, wherein the second component is nested within the first component.

10. The product of claim 1, the operations further comprising selectively causing automatic validation of the modifications made to the data associated with the view of the first component using the transactional process.

11. The product of claim 10, the operations further comprising:
wherein the automatic validation is successful, saving the modifications made to the data associated with the view of the first component using the transactional process; and
wherein the automatic validation is unsuccessful, rolling back the modifications made to the data associated with the view of the first component using the transactional process.

12. The product of claim 1, the transactional process logically coupling an outbound plug of the first component with an inbound plug of the second component.

13. The product of claim 1, wherein the event comprises the receipt of a command indicating a request to navigate from the view of the first component to the view of the second component by activation of an outbound plug associated with the view of the first component.

14. A system comprising:
memory storing a plurality of components associated with a model-view-controller business application; and
one or more processors operable when executed to:
present a view of a first component of the plurality of components, the first component associated with a transactional process operable in part to identify navigation away from the view of the first component to a view of a second component, each component associated with a model-view-controller business application, the second component existing at a logically lower level in the application relative to the first component;
register the first component with the second component at run-time to provide the second component with access to the first component's navigational processes upon navigation to the second component, wherein registering the first component with the second component at run-time comprises:
accessing at least one application programming interface (API) associated with the second component, the API exposing at least one method associated with navigation between components within the business application;
implementing the at least one API associated with the second component at the first component at design-time; and
registering a concrete implementing class of the first component with each of at least one logically lower component including the second component at run-time, the first component's concrete implementing class associated with the API and providing the at least one method associated with navigation to each of the components within the business application;
automatically trigger navigation from the view of the first component to the view of the second component in response to an event; and
perform the transactional process associated with the first component upon triggering navigation from the view of the first component to the view of the second component.

15. The system of claim 14, wherein the navigation from the view of the first component to the view of the second component comprises navigation from a general menu of the business application associated with the first component to a view associated with the logically lower second component.

16. The system of claim 14, wherein the transactional process is performed when the second component is a transactional component.

17. The system of claim 14, the one or more processors further operable to automatically validate modifications made to data associated with the view of the first component.

18. The system of claim 17, the one or more processors further operable to:
wherein the validation is successful, save the modifications made to the data associated with the view of the first component using the transactional process; and
wherein the validation is unsuccessful, present an error message based on the unsuccessful validation and roll back the modifications made to the data associated with the view of the first component using the transactional process.

19. The system of claim 14, the one or more processors further operable to selectively cause automatic validation of the modifications made to the data associated with the view of the first component using the transactional process.

* * * * *